Sept. 12, 1967        H. K. BEYER        3,340,587
METHOD OF FABRICATING SHIELDING ENCLOSURES
Filed Nov. 26, 1965        2 Sheets-Sheet 1
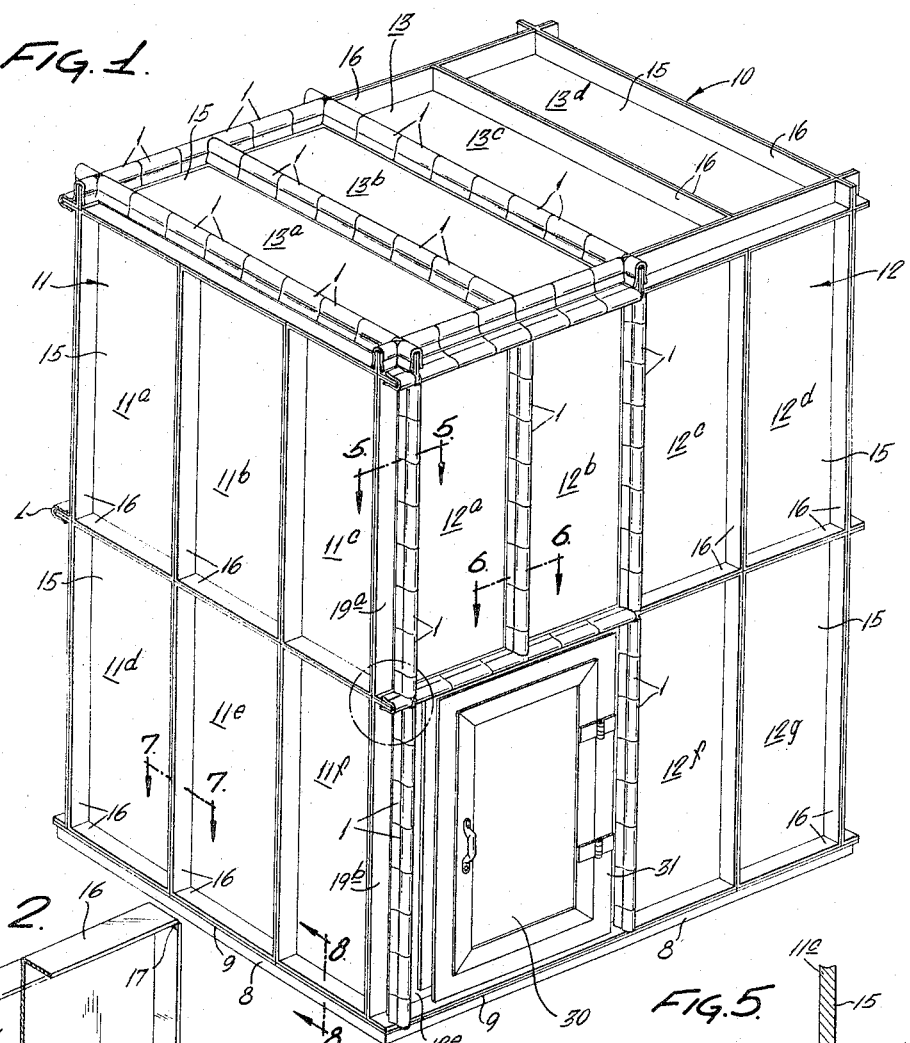
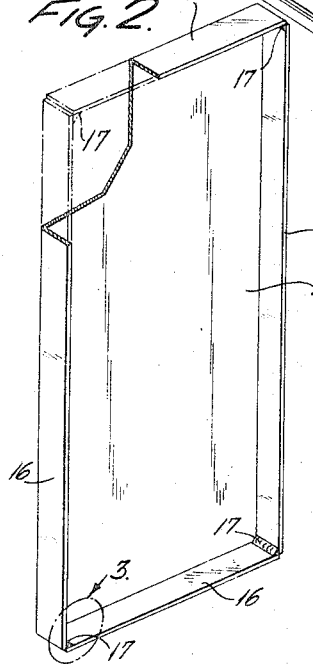
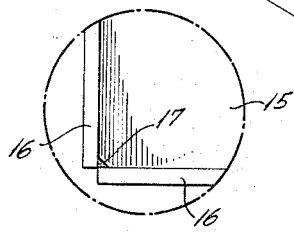
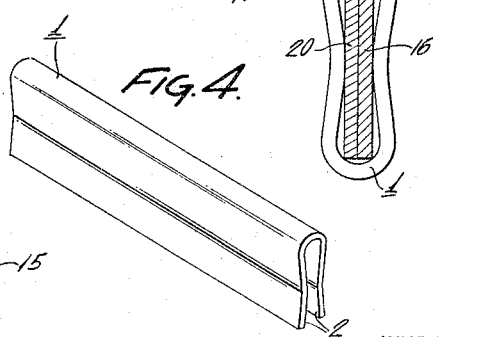
INVENTOR:
HERBERT K. BEYER
BY Howson & Howson
ATTYS.

Sept. 12, 1967     H. K. BEYER     3,340,587
METHOD OF FABRICATING SHIELDING ENCLOSURES
Filed Nov. 26, 1965     2 Sheets-Sheet 2
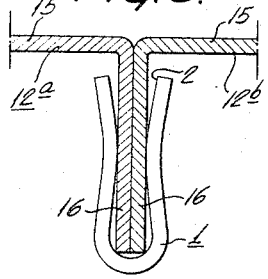
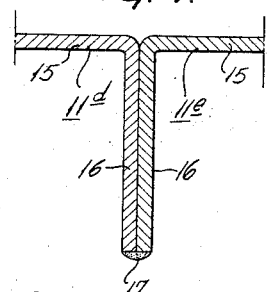
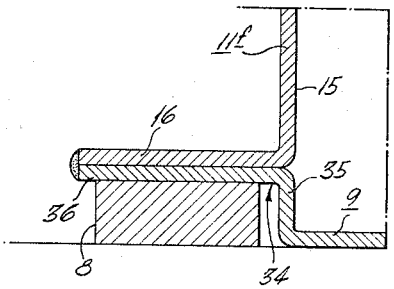
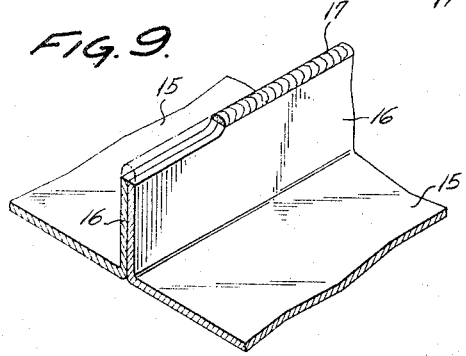
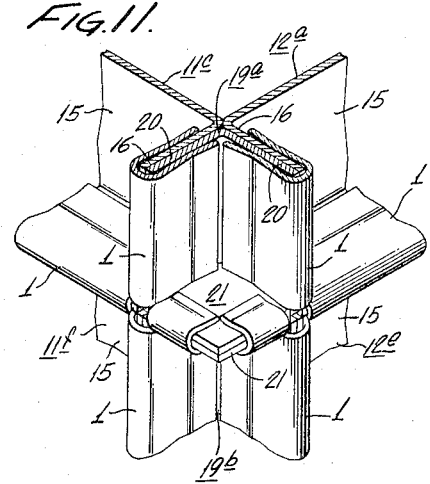
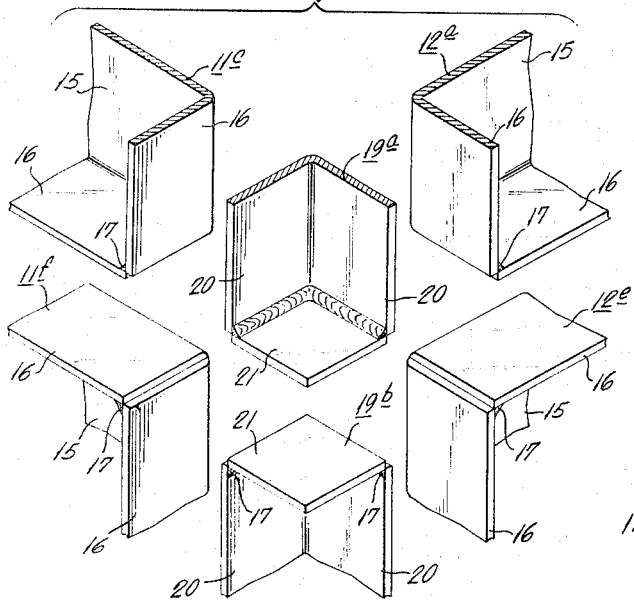
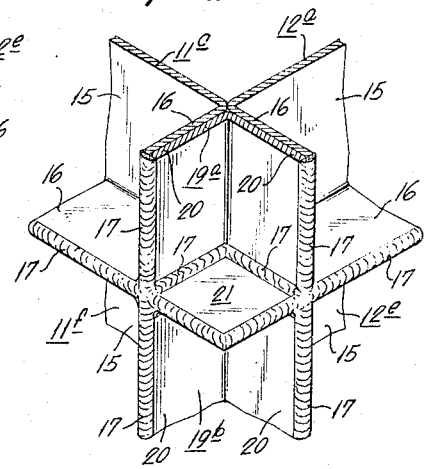
INVENTOR:
HERBERT K. BEYER
BY Howson & Howson
ATTYS.

United States Patent Office 3,340,587
Patented Sept. 12, 1967

3,340,587
METHOD OF FABRICATING SHIELDING ENCLOSURES
Herbert K. Beyer, 600 Pine St., Royersford, Pa. 19468
Filed Nov. 26, 1965, Ser. No. 509,979
7 Claims. (Cl. 29—155)

ABSTRACT OF THE DISCLOSURE

The present invention relates to shielding devices, and in particular to a method of fabricating shielded enclosures which enclosures comprise separate panels which may be shipped in a knocked down form and secured to each other at any desired location to form an enclosure which will effectively shield against electromagnetic radiation and static or varying flux fields.

More particularly the present invention permits the fabrication of a shielded enclosure by complementary and consecutively operable methods, the enclosure having top, bottom and side walls, at least one of which walls comprises a plurality of electrically conductive panels. In the preferred form of the invention, each of the panels has a body portion and upstanding flanges circumscribing the body portion and the method of the invention comprises the steps of disposing the panels adjoining one another with their flanges in face-to-face abutting relation, providing U-shaped spring clips having an interior lateral width at the open end thereof less than the width of the abutting flanges, and forming an electrically continuous wall of the panels by forcing the clips over the abutting flanges to thereby secure adjacent panels to one another. As may be noted, by the method as above outlined, a mechanically connected enclosure is formed. Such an enclosure is particularly useful where the shielding application is not as critical as would be necessitated by more sophisticated and sensitive equipment to be used therein.

However, in certain instances where it is necessary to provide an increase in attenuation, especially in magnetic field and plane wave attenuation, it is a simple operation, in accordance with the method of the present invention, to remove the U-shaped spring clips and connect the adjacent abutting flanges to one another by running a continuous weld along the abutting flanges, and confining the weld to the extended terminus of the flanges whereby dismantling of the wall may be accomplished by cutting the flanges adjacent the weld. In this manner an all-welded or metallurgically connected enclosure having better shielding characteristics against magnetic field and plane wave propagation is provided.

Cross reference to related applications

This application is a continuation-in-part of the Beyer application S.N. 241,952, filed Dec. 3, 1962, now abandoned.

State of the prior art

As is well known to those persons working in the electronic field, the characteristics of electronic equipment are adversely affected by the presence of undesirable interference such as those produced by atmospheric conditions or by electrical and electronic equipment. A shielded area free from such interference has been found necessary for research, testing and operation of many electrical and electronic devices. Hence shielding enclosures and rooms have been devised to attenuate extraneous emissions. Certain of the electronic equipment found in satellites and in missiles are extremely sensitive to extraneous radio waves, and may be triggered from as far away as three and four thousand miles by spurious radio emission in the fractional milliwatt range. Thus on-earth testing of the electronics equipment which goes into such satellites and missiles, must be shielded to prevent inconsistent and nonconclusive results when testing such equipment.

In the early development of shielding enclosures, flat electrically conductive panels were disposed adjoining one another along their edges and were soldered together to insure adequate conductivity therebetween. It was found that although soldering the adjacent panels lent itself to excellent initial attenuation, decreased attenuation occurred with age. Further, the panels of such shielding enclosures were separately designed for each installation, and each panel had to be fitted into its particular space, which limited the speed of assembly and versatility of use. Another major disadvantage of such an enclosure was that it was impractical to knock apart the enclosure and reassemble the panels without damaging the panels or changing the size of the enclosure, and in very large enclosures it was impracticable to move the whole enclosure to another location for further use. Another factor which influenced a lack of commercial acceptance of the soldered paneled enclosures was that soldering did not give the desired structural integrity, and although welding would have made such enclosures structurally stronger, the welding of thin panels was and to some extent still is, a very difficult problem.

In order to enable knockdown and reassembly of shielding enclosures, mechanical fastening means were designed to fasten adjacent panels so as to provide continuous electrical conduction between them. One of the disadvantages of this method of fastening adjacent panels is that a mechanical joint employs line or flat contacts between the adjacent panels and such contacts develop a film coating thereon either by oxidation of the surface or by electrolytic action which raises the resistance between adjacent panels and lowers the effective shielding of the enclosure. A further problem is that it is extremely difficult to get uniform pressure between the edges of the panel sections and therefore it is difficult to obtain uniform electrical contact throughout. However despite these disadvantages, it was felt that the mere fact that the enclosure could be dismantled without destruction of the size of the enclosure was of sufficient advantage that lower attenuation figures could be accepted without too much loss in the efficiency of attenuation of the respective enclosures.

With regard to particular prior art, it should be noted that in an article "The Use of Steel Sheet for the Construction of Shielded Rooms," published in the AIEE Transactions, volume 72, Part 1, November 1953, pages 559–604, Intrator, the writer of the article suggests the use of ferrous metals for the construction of high performance shielded rooms. The joints used in fastening these sheets together are shown in FIG. 4 of the article wherein the sheets were braked into two inch, ninety degree bends, the sheets were then joined by clamping the edges together in two to four foot sections and thereafter fused by brazing. With the Intrator type structure as above described, and as shown in the photographs contained in the article, the braked edges appear to have run vertically in the structure to add rigidity to the structure. In addition, because of the use of the brazing type bond, difficulty in confining the braze to the extended termini of the flanges was encountered, which difficulty prevents a structure such as described by Intrator from being dismantled without modification of the overall size of the structure.

Description of the invention

The present invention combines the advantages of the better conductivity between adjacent panels afforded by soldering them together and the advantages of the mechanically-connected-panel-type structure which enables dismantling and reassembly of the structure without changing its size, this being accomplished by complementary and consecutively operable methods which permit the easy fabrication of a mechanically connected shielding structure for non-critical applications, which structure is easily changeable to one useful for increased attenuation by the novel method of the present invention.

It is a principal object of the present invention to provide a simple and efficient consecutively operable method for shielding electronic equipment from electromagnetic radiation over a major portion of the frequency spectrum as well as for shielding against static and varying flux fields.

It is another object of the present invention to provide a novel method or consecutive methods of fabricating shielding enclosures which are adapted to be quickly and easily assembled and disassembled, and the component parts of which are constructed so as to occupy a minimum of space in their disassembled or knocked down condition to effect economies in transportation and storage.

Still another object of the present invention resides in the provision of interchangeable panels which permit construction and dismantling by those not highly skilled in the art of shielding enclosures.

Another object of the present invention is to provide a novel method or consecutive methods of fabricating shielding enclosures of the type described of modular construction so as to permit ready interchangeability in enclosure size and/or shape.

A still further object of the present invention is to provide a method of fabricating shielding enclosures of the type described which are simple in construction and durable in operation, and which can be manufactured and sold at a reasonable cost.

Other objects and a fuller understanding of the invention may be had by referring to the following description and claims taken in conjunction with the accompanying drawings in which:

FIG. 1 is a perspective view showing a hybrid enclosure constructed in accordance with the complementary and consecutive method of the present invention;

FIG. 2 is a perspective view of a typical panel used in the construction of the enclosure illustrated in FIG. 1;

FIG. 3 is an enlarged elevational view of a corner of a typical panel as indicated at 3 in FIG. 2;

FIG. 4 is an enlarged fragmentary perspective view of a clip used in connecting at least some of the panels shown in FIG. 1;

FIG. 5 is an enlarged fragmentary section view taken along line 5—5 of FIG. 1;

FIG. 6 is an enlarged fragmentary sectional view taken along line 6—6 of FIG. 1;

FIG. 7 is a fragmentary enlarged section taken along line 7—7 of FIG. 1;

FIG. 8 is an enlarged fragmentary section taken along line 8—8 of FIG. 1 illustrating the joining of the floor paneling to the side wall paneling;

FIG. 9 is a fragmentary enlarged perspective view of a typical panel joint illustrating the dismantling of certain adjacent panels illustrated in FIG. 1;

FIG. 10 is an exploded fragmentary enlarged perspective view illustrating the joining of adjacent walls at a corner;

FIG. 11 is an enlarged perspective fragmentary view of the exploded portion shown in FIG. 10 illustrating how the adjacent-wall panels may be joined by clips; and FIG. 12 is an enlarged perspective fragmentary view similar to FIG. 11 but showing how the adjacent wall panels may be joined by welding.

Referring now to the drawings, and specifically to FIGS. 1 and 2 thereof, the embodiment of the invention illustrated therein comprises a generally rectangular shielding enclosure or room 10. The room includes a horizontally disposed bottom wall 9 shown in FIG. 8, upstanding side walls, two of which are shown at 11 and 12, as extending along the side edges of the bottom wall 9, and a horizontally disposed top wall 13 spaced above the bottom wall and extending between the side walls. Each of the bottom side and top walls is composed of at least one panel, the side and top panels being substantially identical in construction, as discussed more fully hereafter. For purposes of illustration, the upstanding side walls 11 and 12 and the top walls 13 are shown as having a plurality of panels. For purposes of identification, the individual panels in the associated side walls have been given the numeral corresponding to that wall and an associated small letter to designate their relative position with respect to each other. One of the side walls, in the illustrated embodiments of side wall 12, may be provided with a door assembly panel 12e having a door 30 and an associated door frame 31 to provide entry and egress from the shielding enclosure 10.

FIG. 2 clearly shows the construction of a typical wall panel which is substantially identical to and interchangeable with any one of the individual panels of the aforementioned side and top wall panels. Thus, the following detailed description of a typical wall panel as illustrated in FIG. 2 will be applicable in all material respects to all of the panels of the side and top wall except the door assembly panel 12a and all except the edge panels of the bottom wall, as described more fully hereinafter. In the embodiment illustrated in FIG. 2, each panel is generally rectangular in shape having flanges 16 substantially perpendicular to a body portion 15 and circumscribing the panel. In the present instance each panel has been fabricated from a flat conductive plate by cutting a square out of the four corners of each plate, the depth of the square or cut being equal to the desired height of the flanges 16, and then forming flanges 16 by bending up the plate on all four sides. A weld 17 may then be laid on the inside (or outside) corners of the flanges thus formed (as shown in FIG. 4) to form an electrically continuous panel including the flange. Of course other means of forming an electrically continuous panel may be employed. However, the above-described manner of constructing panels has been found to be the least expensive.

Even though ordinary thin sheets of mild steel or iron alloy may be used to construct the individual panels, it may be desirable to coat or clad the surface of the sheets with a conductor in order to increase the electrical conductivity of the individual panels in preselected frequency spectrums. To this end such conductors as copper, nickel, zinc, or silver have been used.

In accordance with the present invention, a shielded enclosure may be formed of panels, such as heretofore described, by novel complementary and consecutively operable methods which permit the easy fabrication of a mechanically connected shielding structure for non-critical applications, which structure is easily changeable to one useful for increased attenuation by the novel method of the present invention. To this end, the panels are disposed adjoining one another with their upstanding flanges 16 in face-to-face abutting relation (see FIG. 1). As the panels are disposed in this relationship, they are conveniently joined by connecting means, in the present instance the method of connection being dependent upon whether (1) an enclosure of increased attenuation is desired or (2) if the equipment to be used interiorly thereof does not require relatively high attenuation of signals.

To this end, as illustrated in FIG. 1, a portion of the side wall 12 and a portion of the top wall, notably panels 13a and 13b having panels 12a, 12b and 12e, may be connected to each other via clips 1 such as more fully shown in FIG. 4 and in a manner such as illustrated in FIG. 6. As illustrated in FIG. 4, the clips are U-shaped in cross section and are composed of a spring like or resilient conductive material. Preferably, the clips 1 have an interior lateral width at the open end 2 thereof, less than the width of the abutting flanges so as to form an interference fit when forced, as illustrated in FIG. 6, over adjacent abutting flanges. In fabrication, due to the resilience of the material, it is a simple matter to force the clips over the abutting flanges to thereby secure the adjacent panels to one another.

In order to provide easy dismantling of an enclosure formed with clips 1 over the abutting flanges, it is a simple matter to pry the clips off of the flanges with a claw hammer or the like. In this manner the panels may be moved to a new location and remounted as before, even utilizing the same clips. In addition, if a more sophisticated enclosure is desired, especially one having greater attenuation characteristics with regard to magnetic field or plane waves, it is possible to remove the clips and bond or join one panel to another by a metallurgic connection, as described hereinafter.

To this end, and in accordance with the invention, the manner in which individual panels may be joined to form a complete metallurgically bonded enclosure is best illustrated in FIGS. 1, 5, and 7. Each individual panel is joined to every other panel by a fused bond, or in the present embodiment of the invention utilizing a molecular bond consisting of a weld 17 along and confining it to the outer marginal portions of their mutual abutting flanges (see FIG. 7). It has been found that the inert-gas-shielded arc welding process lends itself effectively to running such a weld without the necessity of chamfering the extended terminus of the abutting flanges. (See FIGS. 5 and 7.)

Where the edges of the walls join at a corner, as for example where the wall 11 joins with wall 12, another means must be used to effectively maintain an electrically conductive surface when using identical side wall panels throughout. To this end, at least one channel 19 is placed lengthwise between the adjacent walls to effectively couple them both mechanically and electrically. As is shown in FIG. 5, the channel 19a may connect the panel 11c and 12a of the mutually perpendicular walls by either providing a clip such as heretofore described to connect adjacent flanges in face-to-face relation or by laying a weld 17 along and confining it to the outer marginal portions of the panel flanges 16 while simultaneously forming the desired electrically conductive surface. As all channels are similar in construction, discussion of one will of necessity cover all.

Illustrative of a typical channel end the manner in which it joins the side walls 11 and 12 is the exploded view of a section of the channels and side wall panels as illustrated in FIG. 10. In the present embodiment of the invention the typical channel 19 has flanges 20 substantially perpendicular to each other and substantially equal in height to the flanges 16 of the panels and in length to at least one side of the channel. Of course channels may be constructed with foreshortened flanges or flanges of any form which permits the faces of the channel flanges to contact the faces of the panel flanges comprising the edge of the mutually perpendicular walls to be joined by the channels. This would mean that if the walls to be joined are to be perpendicular, the two flanges of the channel must be mutually perpendicular, and should terminate, at least for welding purposes, so that the free edges of the channel flanges will register with the free edges of the panel flanges when assembled. Welded to each end of the channel and disposed perpendicular to the flanges 20, for reasons which will hereafter become evident, is an end wall 21. It should be noted that the end walls 21 are welded at both the top and the bottom of the channel prior to assembly. When assembled in accordance with the method of the present invention, the free edges of the end walls 21 are either provided with clips, as shown in FIG. 11, or are welded, as shown in FIG. 12, in such a manner that any number of channels may be placed one on top of the other in end to end relationship in order to join adjacent walls of any height. Further, since the channels of the present embodiment are of the same length as the panels and height as the panel flanges, any one channel may be substituted for any other channel. This channel construction provides a mechanically and electrically effective corner coupling between adjacent walls.

The joining of typical side walls, for example side walls 11 and 12 is best illustrated in FIGS. 11 and 12. FIG. 10 shows a fragmentary exploded view of two panels in side wall 11, 11c and 11f, two channels, 19a and 19b, and the panels 12a and panel 12e in which the door frame 31 is set. Again, in order to couple the adjacent walls and channels, clips 1, as shown in FIG. 11, or a weld 17 as shown in FIG. 12, may couple the mutual abutting flanges of the panels 11c and 11f and the flanges 20 of the channels 19a and 19b. In a like manner, clips or a weld may be extended around the outer marginal portions of the abutting end walls of the channel and the outer marginal portions of the flanges of wall panels 12a and 12e.

There are two places in an enclosure such as the one heretofore described where a departure may be made in order to suit existing or necessary conditions. One of these is the panel 12e wherein means are provided for entry and egress from the enclosure room 10. However, it is a simple matter to build the associated door frame within a panel which, for example, may have a width equal to two panel widths, and a length equal to one panel (see FIG. 1). The other place where a departure from the construction heretofore described may be desired, is along the bottom wall 9 where the bottom wall joins a side wall. Such a structural modification is illustrated in FIG. 8 wherein the edge panels along the bottom wall employ a double bend along the panel flanges in order to mate in facing engagement with the flanges 16 of the lower panels of the side wall of the R.F. enclosure room 10. As FIG. 8 illustrates, the flanges 34 of the panels comprising the bottom wall 9 may be of greater length to provide an upright portion 35 and a horizontal portion 36 to abut the flanges 16 of the side wall panels. As is also illustrated in FIG. 8, it may be desirable to place a separate support member 8 around the enclosure and underneath the mating flanges 16 and 34 of the side wall panel and bottom wall panels in order to support the vertical load of the side walls. The dis-similarity between the panels of the bottom wall and the panels of either the upstanding side walls or of the horizontally disposed top wall 13 makes the bottom wall panels of necessity the only panels not interchangeable with the panels of the other walls. It should be understood however that the bottom wall may be constructed in a manner similar to the top wall 13. In addition, instead of the weld 17 at the outer terminal end of the horizontal portion 36, joining the flange 16, a clip may be placed thereover to secure the portion 36 to the flange 16.

In a like manner, to the construction and dis-assembly of the clip-joined enclosure, construction of the weld-joined enclosure room as heretofore described, lends itself very easily to being dismantled for relocation without sacrificing any of the size of the original enclosure. The dismantling operation may be accomplished by a conventional rotary cutting machine or portable grinder which is adjustable to any depth of cut and is easily mounted on the extended terminus of the flanges of any panel for removing the weld. With cutting apparatus of this type it is a simple matter to cut just below the weld line, as is illustrated in FIG. 9, and thereby leave a smooth polished surface that may later serve as a new surface for rewelding, or if desired clipping, when re-assembling the enclosure at a new location. As long as the depth of cut is kept constant on all panels, every panel, with the exception of those used in the bottom wall, will thereby become interchangeable with every other panel. Thus for example the wall panel 11c may be used in place of panel 12f in a future construction and vice versa, thereby lending itself to ease of re-assembly by personnel not skilled in the enclosure art.

It should be noted that the particular panel construction as described heretofore is not necessarily the only panel construction which may be used in an enclosure room for shielding against electromagnetic radiation and static or varying flux fields. For example, triangular panels placed with their flanges abutting and then clipped or welded along their outer marginal portions may be used in extremely large structures where it may be desirable to increase the structural rigidity of the enclosure. As may easily be recognized, the triangular-type panel would enable construction and reconstruction of an enclosure in a new location in much the same manner as is disclosed above when using rectangular-type panels. Further, in certain instances it may be desirable to slope a wall or a portion thereof either inwardly or outwardly, necessitating the construction of selected panels or corner channels with flanges sloped inward or outward to suit the desired slope of the wall or portion thereof. Of course in that case, only the panels or channels with similarly sloped flanges would be interchangeable with each other.

Other panel shapes may be used when a particular type of external configuration is desired. For example in order to build a quonset-hut type enclosure, the material from which the panels are constructed could first be rolled on a radius equal to the desired curvature of the outer surface. Thereafter flanges may be formed so that panels may be fabricated into a structure of the desired exterior contour in much the same manner as the enclosure heretofore described.

Also, in certain installations where an enclosure is to be built inside a room and the entire volume of the room is required for testing of equipment, making it impractical if not impossible to weld from the outside of the structure, it may be desirable to simply turn the panels so that they may be welded from the inside. However, it should be noted that in a room constructed in that manner, a modified form of corner-channel may be desired to insure complete mechanical and electrical conductivity around the inner surface of the walls and to further allow dismantling and reassembly of the structure in the manner previously described without a change in the basic size of the structure.

It is to be understood that the enclosure of the present design is also easily adaptable for use as an anechoic chamber, wherein an absorption material is placed on the inside walls of the enclosure in order to absorb any radiation from equipment inside the enclosure. In this type of chamber it is desirable to prevent reflections from the interior walls of the enclosure which would occur if the walls of the enclosure were not specially lined. Again the advantages of this type of enclosure are easily and readily seen in that clips to hold such absorption material may easily be welded on the interior surface of the enclosure. In the flat panels of prior art designs of enclosures, wherein separate sheets of metal sandwiched a layer of wood welding on one side of such panels was difficult if not totally impossible without burning the wood sandwiched between the metallic exterior and interior sheets or deteriorating the bonding material.

The advantages of using an all-clipped enclosure versus a welded panel enclosure is the reduction in time required to construct a shielded enclosure. However, as heretofore set forth, the welded panel type enclosure does have definite advantages especially as to attenuation in magnetic or plane wave transmissions. The advantage of the welded panel enclosure is shown by the following certified test report data of shielding effectiveness, under MIL STD-285, which data illustrates the shield effectiveness, by comparison of the all "clipped" panel construction versus the all "welded" panel construction.

| | Clip Panel Constr.— Clampanel, db | Weld Panel Constr.— Weldpanel, db |
| --- | --- | --- |
| Magnetic Field: | | |
| 15 kc | 67 | *≥85 |
| 200 kc | 74 | *≥96 |
| Electric Field: | | |
| 1 mc | *≥130 | *≥128 |
| 18 mc | *≥124 | *≥126 |
| Plane Wave: | | |
| 400 mc | 104 | *≥125 |
| 10 gc | 86 | *≥130 |

*Measurements limited by dynamic range of instrumentation.

Therefore the present invention provides a simple and efficient method for shielding electronic equipment from interference signals over a major portion of the frequency spectrum by providing a shielding enclosure adapted for ease of assembly and disassembly and which permits erection and dismantling without need for specifying the position of specific panels, so that assembly and disassembly may be performed by those not highly skilled in the art of shielding enclosures.

Although the invention has been described with a certain degree of particularity, it is understood that the present disclosure has been made only by way of example and that numerous changes in the method of construction and the method of combining parts may be made without departing from the spirit and the scope of the invention as hereinafter claimed.

What is claimed is:

1. A method of fabricating a modular demountable enclosure for shielding against electromagnetic radiation and static or varying flux fields, said enclosure having top, bottom and side walls at least one of which walls comprises a plurality of electrically conductive panels, each of said panels having a body portion and upstanding flanges circumscribing said body portion, said method comprising the steps of: disposing said panels adjoining one another with their flanges in face-to-face abutting relation, providing U-shaped spring clips having an interior lateral width at the open end thereof less than the width of said abutting flanges, forming an electrically continuous wall of said panels by forcing said clips over said abutting flanges to thereby secure adjacent panels to each other.

2. A method of fabricating a modular demountable enclosure in accordance with claim 1 including the steps of removing said clips by prying them from a position over said abutting flanges.

3. A method of fabricating a modular demountable enclosure in accordance with claim 2 including the steps of connecting adjacent abutting flanges to one another by running a continuous weld along said abutting flanges, and confining said weld to the extended terminus of said flanges.

4. A method of fabricating a modular demountable enclosure in accordance with claim 3 including the step of demounting said wall by cutting said flanges adjacent said weld to remove said weld therefrom.

5. A method of fabricating a modular demountable enclosure in accordance with claim 1 including the step of joining one adjacent wall to said paneled wall by a channel having angularly spaced upstanding flanges, disposing said channel adjoining said panel wall with one of its flanges in face-to-face abutting relation with at least one of the flanges on one of said panels, and forming an electrically continuous corner by forcing a clip over said abutting flanges of said one panel and said channel to secure one to the other.

6. A method of fabricating a modular demountable enclosure for shielding electromagnetic radiation and static or varying flux fields, said enclosure having top, bottom and side walls at least one of which walls comprises a plurality of electrically conductive panels, each of said panels having a body portion and upstanding flanges circumscribing said body portion, said method comprising the steps of: disposing said panels adjoining one another with their flanges in face-to-face abutting relationship, connecting adjacent abutting flanges to one another by running a continuous weld along said abutting flanges to form a continuous shielding wall, and confining said weld to the extended terminus of said flanges whereby dismantling of said wall may be accomplished by cutting said flanges inwardly of said weld and adjacent thereto.

7. A method of fabricating a modular demountable enclosure in accordance with claim 6 including the step of joining one adjacent wall to said paneled wall by a channel having angularly spaced upstanding flanges, disposing said channel adjacent said paneled wall with one of its flanges in face-to-face abutting relation with at least one of the flanges on one of said panels, and forming an electrically continuous corner to said enclosure by running a continuous weld along said abutting flange of said channel and said one panel, and confining said weld to the extended terminus of said flanges whereby dismantling of said panel and said channel may be accomplished by cutting said abutting flanges inwardly of said weld and adjacent thereto.

References Cited

UNITED STATES PATENTS

| | | | |
|---|---|---|---|
| 1,915,743 | 1/1933 | Meerbeck | 174—21 |
| 2,999,569 | 9/1961 | Wilson | 287—189.35 |
| 3,013,103 | 12/1961 | Pettler et al. | 174—35 |
| 3,064,770 | 11/1962 | Andrews | 52—588 |
| 3,068,315 | 12/1962 | McGrath | 174—84 |
| 3,134,020 | 5/1964 | Shoenfeld | 250—108 |
| 3,217,085 | 11/1965 | Lindgren | 174—35 |

FOREIGN PATENTS

| | | |
|---|---|---|
| 960,107 | 3/1957 | Germany. |

OTHER REFERENCES

Intrator: "The Use of Steel Sheet for the Construction of Shielded Rooms," published in AIEE Transactions, vol. 72, Part 1, November 1953, pages 599–604.

JOHN F. CAMPBELL, *Primary Examiner.*

THOMAS H. EAGER, *Examiner.*